US012596229B2

(12) United States Patent
Chang et al.

(10) Patent No.: US 12,596,229 B2
(45) Date of Patent: Apr. 7, 2026

(54) 3D TAPERED NANOPHOTONIC WAVEGUIDE TO FIBER EDGE COUPLER

(71) Applicant: Purdue Research Foundation, West Lafayette, IN (US)

(72) Inventors: Tzu-Han Chang, West Lafayette, IN (US); Chen-Lung Hung, Zionsville, IN (US)

(73) Assignee: Purdue Research Foundation, West Lafayette, IN (US)

( * ) Notice: Subject to any disclaimer, the term of this patent is extended or adjusted under 35 U.S.C. 154(b) by 239 days.

(21) Appl. No.: 18/228,623

(22) Filed: Jul. 31, 2023

(65) Prior Publication Data

US 2024/0369763 A1 Nov. 7, 2024

Related U.S. Application Data

(60) Provisional application No. 63/397,569, filed on Aug. 12, 2022.

(51) Int. Cl.
| | |
|---|---|
| *H04B 10/00* | (2013.01) |
| *G02B 6/122* | (2006.01) |
| *G02B 6/13* | (2006.01) |

(52) U.S. Cl.
CPC ............. *G02B 6/1228* (2013.01); *G02B 6/13* (2013.01)

(58) Field of Classification Search
CPC ........ G02B 6/1228; G02B 6/13; G02B 6/136; G02B 6/305
See application file for complete search history.

(56) References Cited

U.S. PATENT DOCUMENTS

| | | | | |
|---|---|---|---|---|
| 5,987,046 A | * | 11/1999 | Kobayashi | H01S 5/026 |
| | | | | 372/45.01 |
| 6,052,397 A | * | 4/2000 | Jeon | H01S 5/164 |
| | | | | 372/46.01 |
| 6,219,366 B1 | * | 4/2001 | Furushima | H01S 5/10 |
| | | | | 372/50.1 |
| 6,393,185 B1 | * | 5/2002 | Deacon | G02B 6/42 |
| | | | | 385/12 |

(Continued)

OTHER PUBLICATIONS

Wang, J., et al.: "Integrated photonic quantum technologies," Nat. Photonics, 14, 273-284, May 2020; published Oct. 21, 2019.

(Continued)

*Primary Examiner* — Agustin Bello
(74) *Attorney, Agent, or Firm* — Purdue Research Foundation

(57) ABSTRACT

A method of forming an optical waveguide from a multi-layer material is described. The multi-layer material includes a resist material layer deposited over a waveguide material layer, and the waveguide material layer deposited over a first cladding material layer. The method includes using a lithography procedure to form a three-dimensional tapered indentation into a top surface of the resist material layer, transferring the three-dimensional tapered indentation from the resist material layer to the waveguide material layer, forming a three-dimensional tapered optical waveguide by removing a portion of the waveguide material layer adjacent to the three-dimensional tapered indentation, and depositing a second cladding material layer over the optical waveguide to form an optical coupler having an optical input facet.

10 Claims, 13 Drawing Sheets

(56)                References Cited

U.S. PATENT DOCUMENTS

| | | | | |
|---|---|---|---|---|
| 6,921,490 | B1 * | 7/2005 | Qian | G02B 6/138 |
| | | | | 216/24 |
| 6,934,313 | B1 * | 8/2005 | Deacon | H01S 5/4062 |
| | | | | 372/39 |
| 7,359,593 | B2 * | 4/2008 | Little | G02B 6/1228 |
| | | | | 385/28 |
| 8,116,602 | B2 * | 2/2012 | Little | G02B 6/1228 |
| | | | | 398/139 |
| 8,320,721 | B2 * | 11/2012 | Cevini | G02B 6/305 |
| | | | | 385/28 |
| 8,787,712 | B2 * | 7/2014 | Grondin | B82Y 20/00 |
| | | | | 385/28 |
| 9,020,317 | B2 * | 4/2015 | Heideman | G02B 6/14 |
| | | | | 427/163.2 |
| 9,164,235 | B1 * | 10/2015 | Tummidi | G02B 6/42 |
| 9,274,283 | B1 * | 3/2016 | Ellis-Monaghan | |
| | | | | G02B 6/12002 |
| 9,618,699 | B2 * | 4/2017 | Tummidi | G02B 6/107 |
| 9,915,782 | B2 * | 3/2018 | Ahn | G02B 6/12004 |
| 10,031,292 | B2 * | 7/2018 | Chen | G02B 6/14 |
| 10,571,633 | B1 * | 2/2020 | Chen | G02B 6/136 |
| 10,610,087 | B2 * | 4/2020 | Hu | A61B 1/042 |
| 11,947,168 | B2 * | 4/2024 | Bian | G02B 6/1228 |
| 2002/0176679 | A1 * | 11/2002 | Nashimoto | G02B 6/1228 |
| | | | | 216/24 |
| 2003/0053756 | A1 * | 3/2003 | Lam | G02B 6/305 |
| | | | | 385/52 |
| 2004/0005118 | A1 * | 1/2004 | Lee | G02B 6/136 |
| | | | | 385/129 |
| 2004/0057667 | A1 * | 3/2004 | Yamada | G02B 6/305 |
| | | | | 385/50 |
| 2004/0101246 | A1 * | 5/2004 | Kapusta | G02B 6/42 |
| | | | | 385/31 |
| 2004/0114869 | A1 * | 6/2004 | Fike | G02B 6/1228 |
| | | | | 385/28 |
| 2004/0131310 | A1 * | 7/2004 | Walker | G02B 6/136 |
| | | | | 385/39 |
| 2005/0018990 | A1 * | 1/2005 | Shimizu | G03F 7/0017 |
| | | | | 264/1.24 |
| 2005/0105853 | A1 * | 5/2005 | Liu | G02B 6/1228 |
| | | | | 385/39 |
| 2005/0123244 | A1 * | 6/2005 | Block | G02B 6/1221 |
| | | | | 385/39 |
| 2005/0175286 | A1 * | 8/2005 | Patel | G02B 6/42 |
| | | | | 385/130 |
| 2005/0185889 | A1 * | 8/2005 | Xia | H01S 5/5009 |
| | | | | 385/28 |
| 2007/0077017 | A1 * | 4/2007 | Menon | H01S 5/162 |
| | | | | 359/344 |
| 2008/0193079 | A1 | 8/2008 | Cheben et al. | |
| 2011/0170825 | A1 * | 7/2011 | Spector | G02B 6/136 |
| | | | | 438/31 |
| 2012/0328234 | A1 * | 12/2012 | Lu | G02B 6/1228 |
| | | | | 385/14 |
| 2012/0328243 | A1 * | 12/2012 | Fang | G02B 6/305 |
| | | | | 385/50 |
| 2014/0133817 | A1 * | 5/2014 | Lealman | G02B 6/136 |
| | | | | 438/31 |
| 2015/0086153 | A1 * | 3/2015 | Ono | G02B 6/124 |
| | | | | 385/11 |
| 2015/0132002 | A1 * | 5/2015 | Krishnamurthy | H01S 5/06255 |
| | | | | 398/79 |
| 2016/0043262 | A1 * | 2/2016 | Okumura | H10F 77/122 |
| | | | | 438/69 |
| 2016/0306117 | A1 * | 10/2016 | Middlebrook | G02B 1/045 |
| 2018/0011249 | A1 * | 1/2018 | Zhu | G02B 6/12004 |
| 2018/0039027 | A1 | 2/2018 | Kato et al. | |
| 2018/0172909 | A1 * | 6/2018 | Asghari | G02B 6/305 |
| 2020/0225401 | A1 * | 7/2020 | Yu | G02B 6/0043 |
| 2020/0257054 | A1 * | 8/2020 | Venkatesan | G02B 6/305 |
| 2020/0400891 | A1 * | 12/2020 | Sodagar | G02B 6/305 |
| 2021/0223473 | A1 * | 7/2021 | Bian | G02B 6/1228 |

| | | | | |
|---|---|---|---|---|
| 2021/0293525 | A1 * | 9/2021 | Carothers | B82Y 15/00 |
| 2021/0293716 | A1 * | 9/2021 | Carothers | B01L 3/502715 |
| 2021/0302652 | A1 * | 9/2021 | Vulovic | G02B 6/12016 |
| 2022/0137290 | A1 * | 5/2022 | Aboketaf | G02B 6/1228 |
| | | | | 385/14 |
| 2022/0206220 | A1 * | 6/2022 | Barwicz | G02B 6/136 |
| 2022/0244458 | A1 * | 8/2022 | Koch | G02B 6/1221 |
| 2022/0260784 | A1 * | 8/2022 | Jiang | G02B 6/136 |
| 2022/0352685 | A1 * | 11/2022 | Huang | H01S 5/021 |
| 2023/0014644 | A1 * | 1/2023 | Salehzadeh Einabad | |
| | | | | G02B 6/136 |
| 2023/0083043 | A1 * | 3/2023 | Scofield | G02B 6/136 |
| | | | | 385/14 |
| 2023/0375782 | A1 * | 11/2023 | Huang | G02B 6/12004 |
| 2024/0069278 | A1 * | 2/2024 | Chern | G02B 6/1228 |
| 2024/0369763 | A1 * | 11/2024 | Chang | G02B 6/305 |
| 2025/0035840 | A1 * | 1/2025 | Bian | G02B 6/12004 |

OTHER PUBLICATIONS

Kim, J.-H., et al.: "Hybrid integration methods for on-chip quantum photonics," Optica, 7, 4, 291-308, Apr. 2020; published Apr. 8, 2020.

Elshaari, A. W., et al.: "Hybrid integrated quantum photonic circuits," Nat. Photonics, 14, 285-298, May 2020; published Apr. 13, 2020.

Marchetti, R., et al.: "Coupling strategies for silicon photonics integrated chips," Photonics Res., 7, 2, 201-239, Feb. 2019; published Jan. 31, 2019.

Son, G., et al.: "High-efficiency broadband light coupling between optical fibers and photonic integrated circuits," Nanophotonics, 7, 12, 1845-1864, (2018).

Fang, Q., et al.: "Suspended optical fiber-to-waveguide mode size converter for silicon photonics," Opt. Express, 18, 8, 7763-7769, Apr. 12, 2010; published Mar. 30, 2010.

Cheben, P., et al.: "Refractive index engineering with subwavelength gratings for efficient microphotonic couplers and planar waveguide multiplexers," Opt. Lett., 35, 15, 2526-2528, Aug. 1, 2010; published Jul. 20, 2010.

Almeida, V. R., et al.: "Nanotaper for compact mode conversion," Opt. Lett., 28, 15, 1302-1304, Aug. 1, 2003.

Galán, J., et al.: "Polarization insensitive low-loss coupling technique between SOI waveguides and high mode field diameter single-mode fibers," Opt. Express, 15, 11, 7058-7065, May 28, 2007; published May 24, 2007.

Fang, Q. et al.: "Low loss fiber-to-waveguide converter with a 3-D functional taper for silicon photonics," IEEE Photonics Technol. Lett., 28, 22, 2533-2536, Nov. 15, 2016; published Aug. 24, 2016.

Papes, M., et al.: "Fiber-chip edge coupler with large mode size for silicon photonic wire waveguides," Opt. Express, 24, 5, 5026-5038, Mar. 7, 2016; published Feb. 29, 2016.

Park, H., et al.: "A fiber-to-chip coupler based on Si/SiON cascaded tapers for Si photonic chips," Opt. Express, 21, 24, 29313-29319, Dec. 2, 2013; published Nov. 19, 2013.

Liao, C.-W., et al.: "Fiber-core-matched three-dimensional adiabatic tapered couplers for integrated photonic devices," J. Lightwave Technology, 29, 5, 770-774, Mar. 1, 2011; published Dec. 23, 2010.

Gordillo, O. A. J., et al.: "Plug-and-play fiber to waveguide connector," Opt. Express, 27, 15, 20305-20310, Jul. 22, 2019; published Jul. 9, 2019.

Fritze, M., et al.: "Fabrication of three-dimensional mode converters for silicon-based integrated optics," J. Vac. Sci. & Technol. B: Microelectron. Nanometer Struct. Process. Meas. Phenom, 21, 6, 2897-2902, Nov./Dec. 2003; published Dec. 9, 2003.

Zhang, W., et al.: "Buried 3D spot-size converters for silicon photonics," Optica, 8, 8, 1102-1108, Aug. 2021; published Aug. 13, 2021.

Chang, T.-H., et al.: "Efficiently coupled microring circuit for on-chip cavity QED with trapped atoms," Appl. Phys. Lett., 117, 174001, (2020); published Oct. 27, 2020.

Zhou, X., et al.: "Subwavelength precision optical guiding for trapped atoms coupled to a nanophotonic resonator," arXiv preprint, arXiv:2111.01119v1 [quant-ph], Nov. 2, 2021.

(56)         References Cited

OTHER PUBLICATIONS

Vivien, L., et al.: "Design, realization, and characterization of 3-D taper for fiber/micro-waveguide coupling," IEEE J. of Selected Topics in Quantum Electronics, 12, 6, 1354-1358, Nov./Dec. 2006.

Chang, T.-H., et al.: "Microring resonators on a suspended membrane circuit for atom-light interactions," Optica, 6, 9, 1203-1210, Sep. 2019; published Sep. 11, 2019.

Kim, M. E., et al.: "Trapping single atoms on a nanophotonic circuit with configurable tweezer lattices," Nat. Communications, 10, 1-8, (2019); published Apr. 9, 2019.

Schleunitz, A., et al.: "Novel 3D micro-and nanofabrication method using thermally activated selective topography equilibration (TASTE) of polymers," Nano Convergence, 1, 7, 1-8, (2014); published Feb. 28, 2014.

Schleunitz, A., et al.: "Selective profile transformation of electron-beam exposed multilevel resist structures based on a molecular weight dependent thermal reflow," J. Vac. Sci. & Technol., Nanotechnol. Microelectron. Materials, Process. Meas. Phenom., 29, 06F302, Nov./Dec. 2011; published Sep. 9, 2011.

Schleunitz, A., et al.: "Fabrication of 3D nanoimprint stamps with continuous reliefs using dose-modulated electron beam lithography and thermal reflow," J. Micromechanics Microengineering, 20, 095002, 2-6, (2010); published Aug. 5, 2010.

Lee, J., et al.: "Low temperature silicon nitride and silicon dioxide film processing by inductively coupled plasma chemical vapor deposition," J. The Electrochem. Soc., 147, 4, 1481-1486 (2000).

Kshirsagar, S. G. A., et al., "Optimisation and fabrication of low-stress, low-temperature silicon oxide cantilevers," Micro & Nano Lett., 6, 7, 476-481, (2011).

Revuri, P. K., et al., "Silicon and silicon dioxide thin films deposited by ICPCVD at low temperature and high rate for MEMS applications," in 2018 Conference on Optoelectronic and Microelectronic Materials and Devices (COMMAD), (IEEE, 2018), 24-26, Dec. 9-13, 2018.

Kippenberg, T., et al., "Fabrication and coupling to planar high-Q silica disk microcavities," Appl. Phys. Lett., 83, 4797-799, Jul. 28, 2003; published Jul. 22, 2003.

Savchenkov, A. A., et al., "Kilohertz optical resonances in dielectric crystal cavities," Phys. Rev. A, 70, 5, 051804-1-4, (2004); published Nov. 30, 2004.

Ji, X., et al., "Ultra-low-loss on-chip resonators with sub-milliwatt parametric oscillation threshold," Optica, 4, 6, 619-624, Jun. 2017; published Jun. 6, 2017.

Xuan, Y., et al., "High-Q silicon nitride microresonators exhibiting low-power frequency comb initiation," Optica, 3, 11, 1171-1180, Nov. 2016; published Oct. 24, 2016.

Bock, P. J., et al., "Subwavelength grating crossings for silicon wire waveguides," Opt. Express, 18, 15, 16146-16155, Jul. 19, 2010; published Jul. 15, 2010.

Jones, A. M., et al., "Ultra-low crosstalk, CMOS compatible waveguide crossings for densely integrated photonic interconnection networks," Opt. Express, 21, 10, 2002-12013, May 20, 2013; published May 9, 2013.

Wu, S., et al., "State-of-the-art and perspectives on silicon waveguide crossings: A review,", Micromachines, 11, 326, 1-16, (2020); published Mar. 20, 2020.

Sacher, W. D., et al., "Monolithically integrated multilayer silicon nitride-on-silicon waveguide platforms for 3-d photonic circuits and devices," , Proceedings of the IEEE, 106, 12, 2232-2245, Dec. 2018; published Aug. 30, 2018.

Chiles, J., et al., "Multi-planar amorphous silicon photonics with compact interplanar couplers, cross talk mitigation, and low crossing loss," APL Photonics, 2, 11, 116101-1--7, (2017); published Oct. 11, 2017.

Shang, K., et al., "Low-loss compact multilayer silicon nitride platform for 3D photonic integrated circuits," Opt. Express, 23, 16, 21334-21342, Aug. 10, 2015.; published Aug. 6, 2015.

Dietrich, P.-I., et al., "In situ 3D nanoprinting of free-form coupling elements for hybrid photonic integration," Nat. Photonics, 12, 241-247, Apr. 2018; published Mar. 26, 2018.

Bernabé, S., et al., "Chip-to-chip optical interconnections between stacked self-aligned SOI photonic chips," Opt. Express, 20, 7, 7886-7894, Mar. 26, 2012; published Mar. 21, 2012.

Blaicher, M., et al., "Hybrid multi-chip assembly of optical communication engines by in situ 3D nano-lithography," Light: Science & Applications, 9, 71, 1-11, (2020); published Apr. 27, 2020.

Tummidi, R. S. et al., "Multilayer Silicon Nitride-based Coupler Integrated into a Silicon Photonics Platform with <1 dB Coupling Loss to a Standard SMF over O, S, C and L Optical Bands," IEEE Explore, (TH2A.10.pdf) OFC (2020) ; 3 pages.

Takei, R., et al., "Silicon knife-edge taper waveguide for ultralow-loss spot-size converter fabricated by photolithography," Appl. Phys. Lett., 102, 101108-1--4, (2013); published Mar. 13, 2013.

Cheben, P., et al., "Broadband polarization independent nanophotonic coupler for silicon waveguides with ultra-high efficiency," Optics Express, 23, 17, 22553-22563, Aug. 24, 2015; published Aug. 18, 2015.

* cited by examiner

3D TAPERED NANOPHOTONIC WAVEGUIDE TO FIBER EDGE COUPLER

CROSS-REFERENCE TO RELATED APPLICATIONS

This application is related to and claims the priority benefit of U.S. Provisional Patent Application No. 63/397,569, entitled "3D Tapered Nanophotonic Waveguide to Fiber Edge Coupler," filed Aug. 12, 2022, the contents of which are hereby incorporated by reference in their entirety into the present disclosure.

GOVERNMENT SUPPORT CLAUSE

This invention was made with government support under Grant No. FA9550-22-1-0031 awarded by the Air Force Office of Scientific Research (AFOSR), and under ECCS2134931 awarded by the National Science Foundation (NSF). The government has certain rights in the invention.

TECHNICAL FIELD

The present application relates to integrated photonics, and specifically to nanophotonic waveguide-to-fiber edge couplers that improve optical coupling efficiency between optical fibers and optical waveguides.

BACKGROUND

Integrated photonics focuses on integrating various optical components, such as waveguides, modulators, detectors, and light sources, onto a single chip or substrate. Its main goal is to create compact and highly functional optical systems by consolidating these components. The need for integrated photonics arises from the increasing demand for high-speed and high-bandwidth communication systems, as well as the growing requirements for efficient and scalable optical devices in different applications. By integrating multiple optical components on a chip, integrated photonics offers several advantages over traditional bulk optics. For example, integrated photonics allows for the miniaturization of optical components, making devices smaller and more portable. This is particularly valuable in applications where space is limited, such as data centers, telecommunications, and biomedical devices. Another advantage is improved performance. Integration reduces the number of optical interfaces, which minimizes losses, reflections, and alignment issues commonly encountered in bulk optics. Consequently, device performance improves, including higher efficiency, lower power consumption, and enhanced signal quality. Scalability and cost-effectiveness are additional benefits of integrated photonics. It leverages high-volume and low-cost fabrication processes, similar to semiconductor manufacturing. This scalability and cost-effectiveness enable mass production of integrated photonic devices, making them more affordable and widely accessible.

Nanophotonic waveguides are key components within integrated photonics. They confine and guide light at the nanoscale, enabling precise control and manipulation of light signals on the chip. Nanophotonic waveguides act as optical channels, routing and distributing light from one component to another within the integrated photonic circuit. These waveguides are often made from high refractive index materials such as silicon or silicon nitride, and they are formed with small dimensions that allow for strong light confinement and efficient propagation over short distances.

They can be engineered to possess desired properties such as low propagation loss, dispersion control, and mode matching with other integrated components.

Efficient coupling of light between nanophotonic waveguides and optical fibers is therefore important in certain applications. Nanophotonic waveguide-to-fiber edge couplers serve as connectors or interfaces between the nanophotonic waveguides on the chip and the optical fibers. Their primary purpose is to enable efficient and low-loss transfer of light signals between these two components. Nanophotonic waveguide-to-fiber edge couplers often incorporate tapered waveguide sections, grating structures, or other techniques to control the light propagation and improve the overlap between the waveguide mode and the fiber mode. These design elements enhance power transfer and reduce losses caused by reflections or scattering at the interface.

Efficient coupling between nanophotonic waveguides and fibers is important because it ensures minimal signal loss and maximizes the performance of the integrated photonic system. It allows for seamless integration of nanophotonic devices with existing fiber-based optical systems, such as those used in long-distance communication networks or fiber optic sensing applications. However, existing couplers achieve low coupling efficiency due to mode-mismatch. Thus, improved nanophotonic waveguide-to-fiber edge couplers are needed.

SUMMARY

Accordingly, described herein are efficiently coupled 3D tapered waveguide edge-couplers (TWCs). The 3D TWC designs can achieve highly efficient flat-cleaved fiber to silicon nitride photonic waveguide coupling, with improved polarization-insensitive coupling efficiency, wide bandwidth, and improved misalignment tolerance. Beyond applications in high-efficiency photon coupling, the 3D lithography techniques can provide a complementary approach for mode field shaping and effective refractive index engineering, useful for many applications in integrated photonic circuits.

Methods of forming optical waveguides can include various acts. In some applications, a multi-layer material can include a resist material layer deposited over a waveguide material layer, and the waveguide material layer can be deposited over a first cladding material layer. The acts can include using a lithography procedure to form a three-dimensional tapered indentation into a top surface of the resist material layer. The three-dimensional tapered indentation can define a length separated by a first end having a first depth and a second end having a second depth. The first depth can be greater than the second depth. Further acts can include transferring the three-dimensional tapered indentation from the resist material layer to the waveguide material layer, forming a three-dimensional tapered optical waveguide by removing a portion of the waveguide material layer adjacent to the three-dimensional tapered indentation, and depositing a second cladding material layer over the optical waveguide to form an optical coupler having an optical input facet.

In some embodiments, the resist material layer can include a positive resist material such as polymethyl methacrylate (PMMA). Further, the lithography procedure can include micro-lithography, such as electron beam lithography or photolithography.

In still further embodiments, forming the three-dimensional tapered indentation into a top surface of the resist material layer can include forming a series of staircase structures into the top surface of the resist material layer, with each surface of each staircase structure extending into the resist material layer in a direction perpendicular to the top surface of the resist material layer defines a sloped surface, and thermally smoothing the series of staircase structures into a continuous slope between the first end and the second end. Additionally, in some embodiments, transferring the three-dimensional tapered indentation from the resist material layer to the waveguide material layer can be performed using plasma etching and removing the resist material layer.

The method can also include depositing a second cladding material layer over the optical waveguide includes performing at least one of a plasma-enhanced chemical vapor deposition (PECVD) procedure, a low-pressure chemical vapor deposition (LPCVD) procedure, or a high-density plasma chemical vapor deposition (HDPCVD) procedure. Further, the method can include trimming the optical input facet to therefore modify a guided mode profile of the optical waveguide. In some applications, trimming the optical input facet can include a third lithography procedure and at least one of a second etching procedure or a cleaving procedure.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1A:
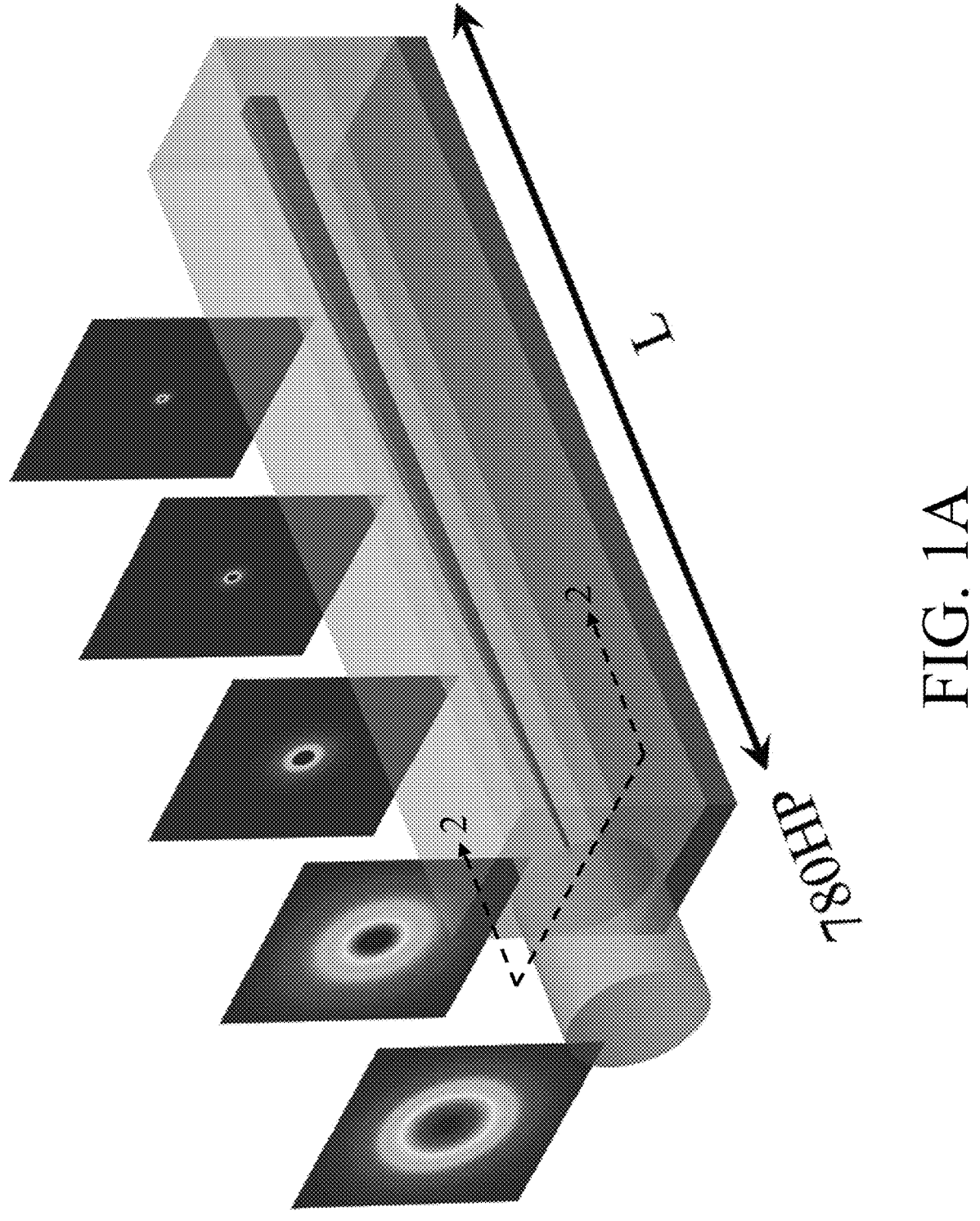
FIG. 1A depicts a schematic view of one exemplary 3D tapered waveguide coupler edge coupled with a flat-cleaved optical fiber.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION OF THE
ILLUSTRATED EMBODIMENTS

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Overview

Integrated photonics is a rapidly developing technology, not only offering compact, low-power devices for classical communication and sensing applications, but also promising realization of scalable photonics quantum computations and quantum nonlinear optics with integrated quantum emitters. By realizing strong light-emitter interaction at chip scale, integrated photonic circuits form sought-after scalable quantum platforms with improved component density, low optical loss, and phase stability. Achieving large-scale, high-fidelity quantum operations with photonic circuits, however, relies on highly efficient chip-to-chip or fiber-to-chip photon coupling for network communications. It also relies on low-loss connections to single-photon sources or detectors. Realizing nearly perfect nanophotonic interfaces with standard fiber optics would therefore be a key feature. Various schemes have been proposed and implemented to minimize coupling losses, such as grating couplers, edge couplers, and adiabatic couplers. However, efficiencies of these couplers are typically sensitive to wavelength, polarization, coupler geometry, and misalignment, thus making it difficult to satisfy stringent requirements of many demanding quantum applications.

In silicon and silicon nitride photonics, conventional inverse-tapered waveguide edge-couplers are relatively easy to fabricate, but they usually achieve low coupling efficiency with flat-cleaved optical fibers due to mode-mismatches. In most designs, an edge-coupler is buried inside a thick oxide cladding. The width of the coupling waveguide tapers down to a small size at the end facet (e.g., typically with $d<100$ nm) to expand its mode field approaching that of an optical fiber. The height (h) of the edge-coupler, on the other hand, remains fixed as needed in standard 2D lithography and is pre-determined by the thickness of the device layer. However, for optical circuits with device thickness $h>600$ nm, fiber edge-coupling efficiency could still be limited by the minimal achievable width $d\gtrsim50$ nm at the facet, leading to significant mode-mismatch. Coupling efficiency is also polarization-sensitive due to highly asymmetric waveguide edge-coupler geometry.

To achieve higher coupling efficiency $\geq90\%$ ($\leq0.5$ dB loss) in fiber edge-coupling methods, existing solutions often use spot-size converters (SSCs) with either lensed or cleaved fibers. However, lensed fibers have very low misalignment tolerance ($\geq1$ dB loss for displacement less than $\pm0.5$ micrometers ($\mu$m)), thus necessitating precise fiber alignment that may be difficult to achieve in various integrated applications. On the other hand, SSCs for cleaved fiber usually require additional complicated 2.5D/3D fabrication steps for a thick cladding layer or a large-core waveguide.

Described herein is an alternative solution including a 3D tapered waveguide edge-coupler (TWC) which overcomes the device thickness limitations to achieve polarization-insensitivity and high fiber-coupling efficiency. An improved lithography technique is utilized to create smooth local ramps in the device layer thickness prior to patterning TWCs. This allows fabrication of precise 3D taper profiles on a functional nanophotonic circuit. The described 3D TWCs demonstrate efficient coupling efficiency with flat-cleaved optical fibers with $<0.8$ dB loss for both the fundamental transverse-electric (TE) and transverse-magnetic (TM) modes, and in a wide spectral range. Experimental result shows more than 6 dB improvement over previous works, thus demonstrating the practical functionality of 3D TWCs. Moreover, the described fabrication technique may be extended to create other thickness-tapering structures or novel 3D lithographic photonic devices.

II. Exemplary Tapered Waveguide-to-Fiber
Couplers

As shown in FIGS. 1A-1D, optimized mode-matching conditions were found between an optical fiber (780 HP) and the end facet of a $Si_3N_4$ waveguide embedded in a $S_iO_2$ cladding structure of various widths and thicknesses. The calculation focuses on optical wavelengths near 852 nanometers (nm), but the design can be easily rescaled to accommodate other wavelengths. In principle, a 3D TWC can achieve high coupling efficiency when the cladding is thick enough to cover the guided mode emitted from an optical fiber. However, the coupler can also be optimized for devices with smaller cladding or asymmetric stacks of cladding layers. In the simulations described later in this description, a layer of silicon nitride (e.g., of 500 nm thickness) was included in the substrate as this may be used in some fabricated devices. For general photonic structures, this may be replaced by silicon as well as other materials or it may be removed.

Figure 1B:
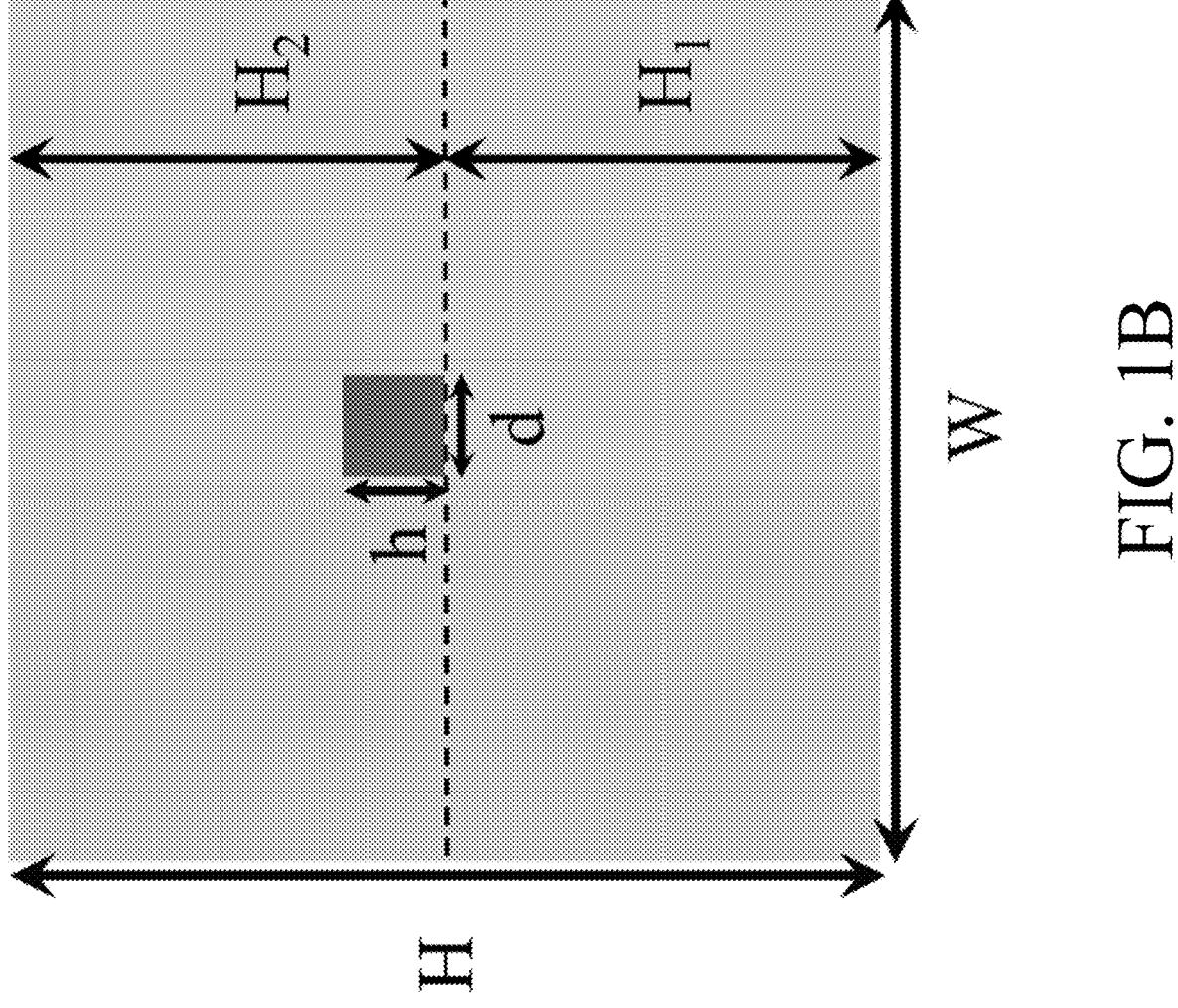
FIG. 1B depicts a cross-sectional view of the 3D tapered waveguide coupler of FIG. 1A, taken across cutting plane 2-2 of FIG. 1A.

The overlap between waveguide (w) and fiber (f) fundamental modes is calculated at the coupler facet via:

$$\mathcal{T} = \mathrm{Re}\left[\frac{\left(\int E_w \times H_f^* \cdot dA\right)\left(\int E_f \times H_w^* \cdot dA\right)}{\int E_w \times H_w^* \cdot dA}\right] / \mathrm{Re}\left(\int E_f \times H_f^* \cdot dA\right),$$

where the mode electric fields $E_{f,w}$ as well as magnetic fields $H_{f,w}$ are extracted using a finite difference eigenmode (FDE) solver. The overlap $\mathcal{T}$ quantifies the initial coupling efficiency between the fiber and the edge-coupler. The geometry is shown in FIG. 1B.

Figure 1C:
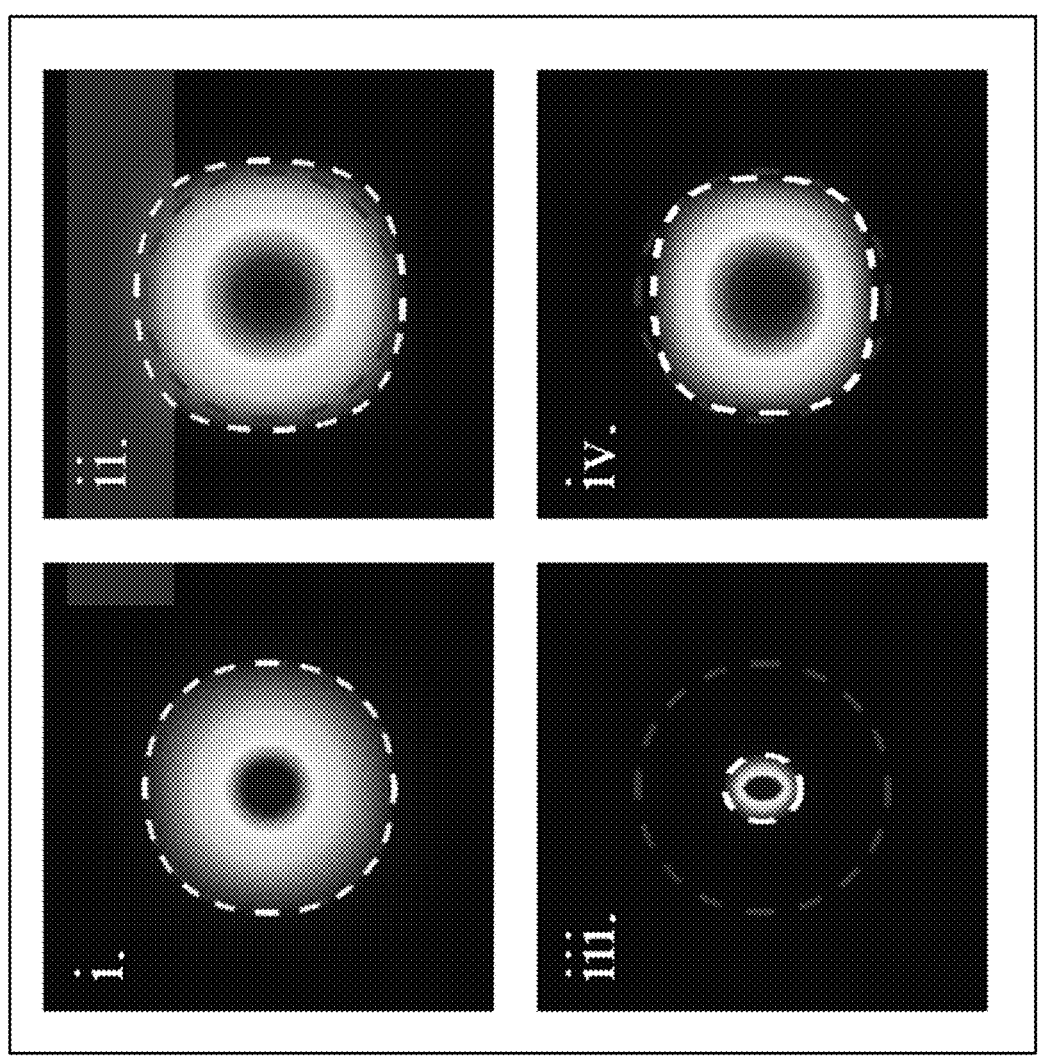
FIG. 1C depicts simulated outputs of four intensity profiles (i-iv) of the fundamental transverse-magnetic (TM) modes at the facets of four different 3D tapered waveguide couplers having different geometries (W, H, d, h)=(i) (8, 8, 0.12, 0.12) μm, (ii) (7, 7, 0.05, 0.05) μm, (iii) (8, 8, 0.05, 0.8) μm, and (iv) the device under test (DUT), respectively, each showing dashed line marks indicating the mode field diameter of the optical fiber (i.e., edge-coupler), the substrates being ignored.
Figure 1D:
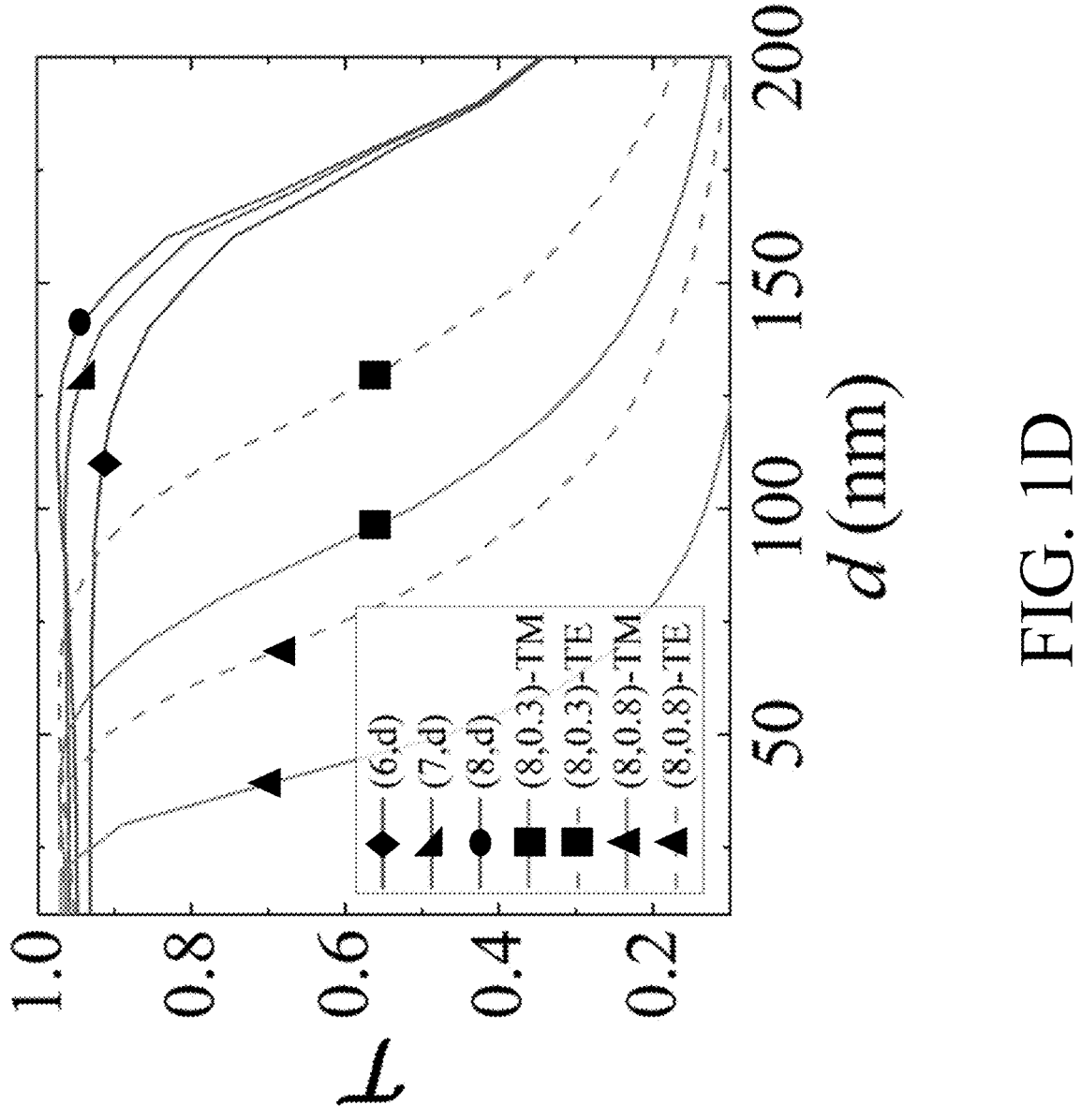
FIG. 1D depicts a graphical chart showing mode field overlap versus width d of the four 3D tapered waveguide couplers (i-iv) at various facet geometries, showing a legend which marks the size (W=H, h)/μm, and coupled modes (transverse-electric TE/TM) in the case of asymmetric couplers, the substrates being ignored.

Simple cases are considered where the width and height of a coupler facet and its cladding are symmetric (e.g., d=h and W=H), and the structure is aligned to the fiber core. It is found that, for 3D TWCs, achievable mode overlaps and characteristics of coupled modes largely depend on the cladding size and geometry. In a reasonably large cladding thickness, W=H=8 μm, the mode overlap could reach an optimal value $\mathcal{T}\approx97\%$ at d=h≈120 nm, as shown in FIG. 1D. In this case with a clear optimal waveguide facet size, the mode is guided by the $Si_3N_4$ waveguide and is well-defined within the cladding, as shown in FIG. 1C, section (i). It is noted that $\mathcal{T}$ may be higher with even thicker cladding. For cases with W=H≲7 μm, the optimal waveguide size (d=h) approaches zero, indicating that the best mode-matched profile may be confined by the $S_iO_2$ cladding. Nevertheless, mode overlap $\mathcal{T}$ is already ≳90% at finite d=h≲100 nm.

In contrast, for 2D tapered waveguides with larger constant thickness h, sufficient mode overlap occurs when the width d≲50 nm, as shown in FIG. 1C, section (iii) and FIG. 1D. It can be challenging to fabricate such a narrow waveguide, especially for a thick device layer, which would require a thick photoresist or e-beam resist layer that could collapse during the lithography process.

It is also shown that a 3D TWC is more tolerant on asymmetry in the oxide cladding. For example, the device under test (DUT) in this work has a thinner layer of buried oxide (thickness $H_1$=2.2 μm) and a thicker top cladding (thickness $H_2$=3.5 μm). It has limited total height H=$H_1$+$H_2$=5.8 μm and width W=6.2 μm, and a small waveguide facet geometry d=h=50 nm. The mode profile at the facet fills the oxide cladding [see, FIG. 1C, section (iv)], but could still reach $\mathcal{T}\gtrsim85\%$ mode-matching efficiency even when the mode is slightly distorted by the waveguide facet.

III. Simulation Results for the Tapered Waveguide-to-Fiber Couplers

Once the end facet geometry has been determined, the taper length can be optimized for maximizing coupling efficiency into a nominal $Si_3N_4$ waveguide. An optimal length exists for there is substrate leakage loss and possibly scattering loss (not included in the simulation), which can demand a shorter taper length, and the mode mismatch loss, which can prefer a more adiabatic taper profile.

Optimized taper lengths are compared for three different silica cladding and facet geometries. Considered are (i) a symmetric coupler with thick cladding W=H=8 μm and an optimal facet size d=h=0.12 μm, and (ii) a 7 μm-thick silica cladding with a small facet size d=h=50 nm. Lastly, discussed is (iii) the DUT with asymmetric cladding and W≈H≈6 μm. These three geometries represent coupling an optical fiber to end-facet modes of three different characteristics: (i) a waveguide-guided mode, (ii) a cladding-guided mode, and (iii) an asymmetric cladding-guided mode, respectively.

Figure 2A:
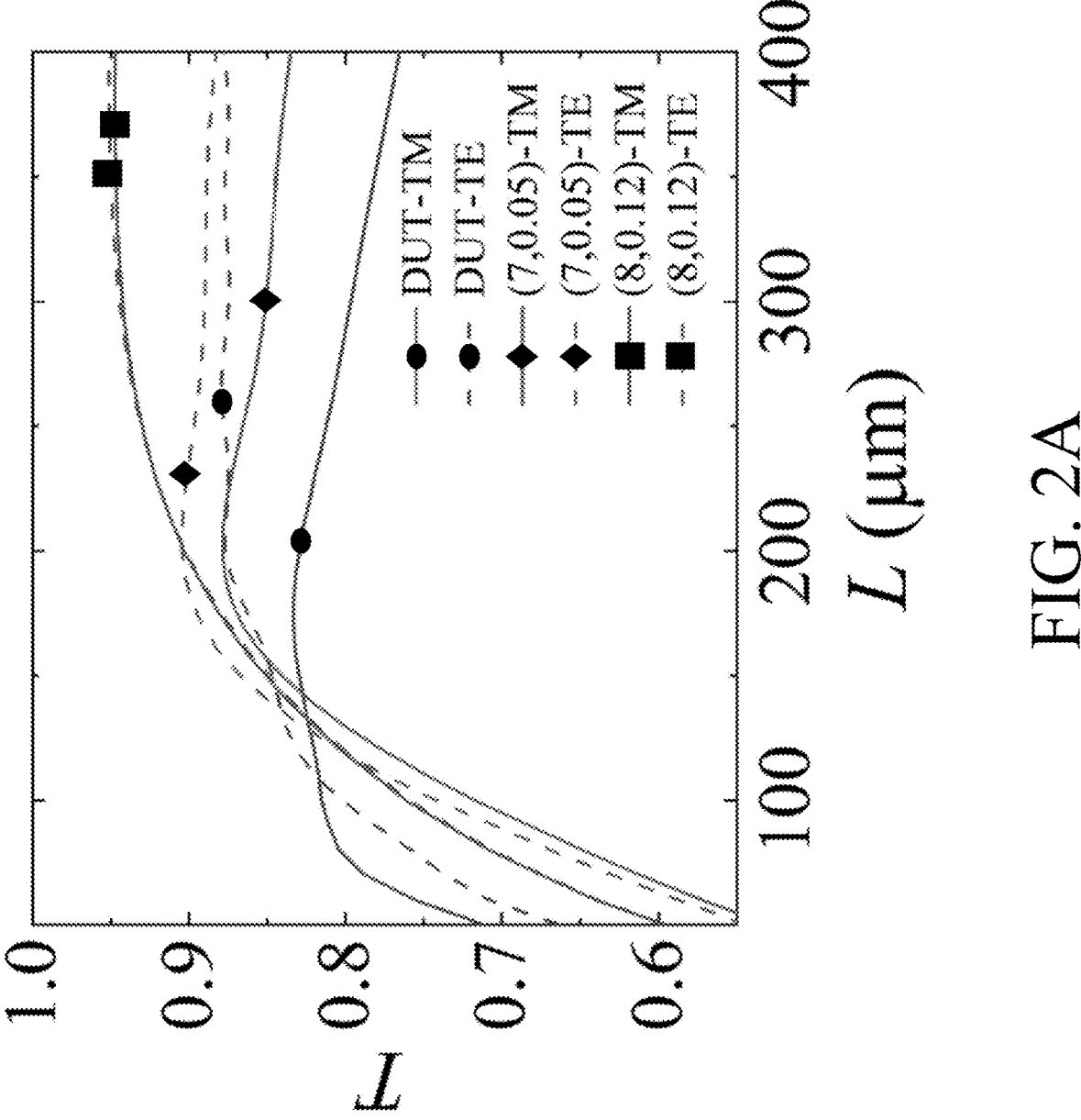
FIG. 2A depicts a graphical chart showing taper length optimization and broadband transmission spectrum of the four 3D tapered waveguide couplers (i-iv), showing the simulated transmission at 852 nm versus taper length L for the DUT (3D tapered waveguide coupler iv) and other labeled coupler geometries (W=H, h)/μm.
Figure 2B:
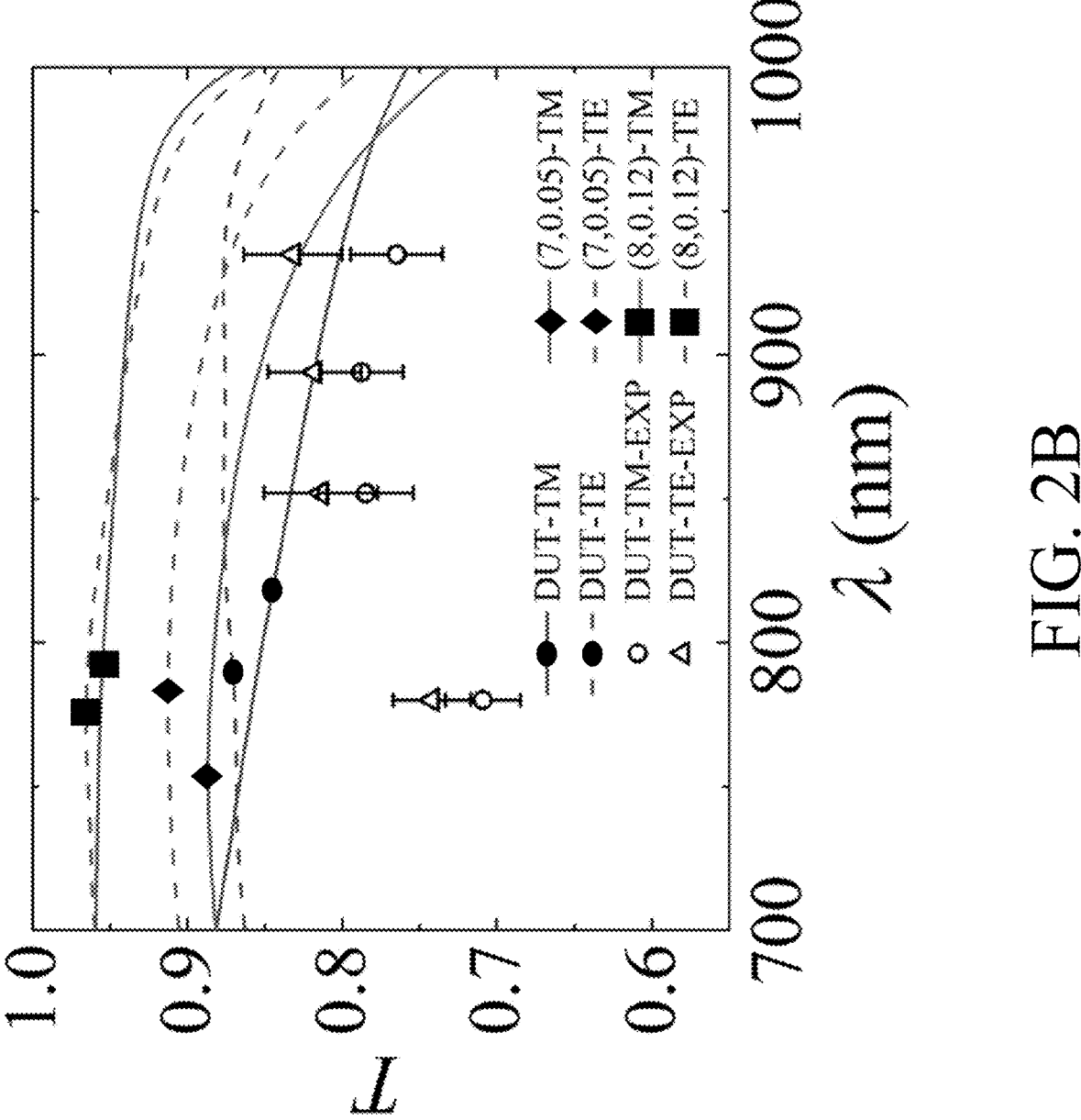
FIG. 2B depicts a graphical chart showing simulated and measured (open symbols) transmission spectrums at the optimal taper lengths of the four 3D tapered waveguide couplers (i-iv)

A simple taper length optimization is performed by linearly ramping the waveguide cross-section from its initial size to an intermediate size of d=h=300 nm in a variable distance L. The total transmission Tis then calculated from an optical fiber to the end of the taper by using a bidirectional eigenmode expansion (EME) solver, as shown in FIGS. 2A-B. In these simple scans, it is found that, for (i), the field of a waveguide-guided mode suffers lower substrate leakage and could thus afford longer taper length at L≈380 μm to achieve smaller mode-mismatch loss and a larger overall coupling efficiency T≈95%. For (ii) [(iii)], it is found that a taper length of L≈200 μm (170 μm) efficiently transfers a cladding-guided mode (asymmetric mode of DUT) into a nominal waveguide-guided mode. For both (ii) and (iii), coupling efficiencies drop as L>200 μm due to finite leakage into the substrate.

In addition, it is found that fiber coupling to a waveguide TM-mode is generally less efficient, up to 5% smaller (at 852 nm) via either the cladding-guided or asymmetric modes. This is due to a TM mode's stronger electric field near the substrate, which results in higher leakage loss. Direct coupling to the waveguide-guided case with thick cladding (8 μm), on the other hand, is nearly symmetric for TE and TM modes and is thus polarization insensitive.

It is shown that a 3D TWC could also work in a wide spectral range. Shown in FIG. 2B are simulated transmission spectra of 3D TWCs initially optimized for λ=852 nm. Here the coupling efficiencies in almost all cases remain nearly constant over a wide spectral range Δλ~250 nm, with less than ±0.1 dB or ±2.5% variation. The bandwidth can be limited by the substrate leakage loss at longer wavelengths (λ≳950 nm) and mode mismatch at shorter wavelengths (λ≲750 nm).

III. Experimental Results for the Tapered Waveguide-to-Fiber Couplers

Figure 4B:
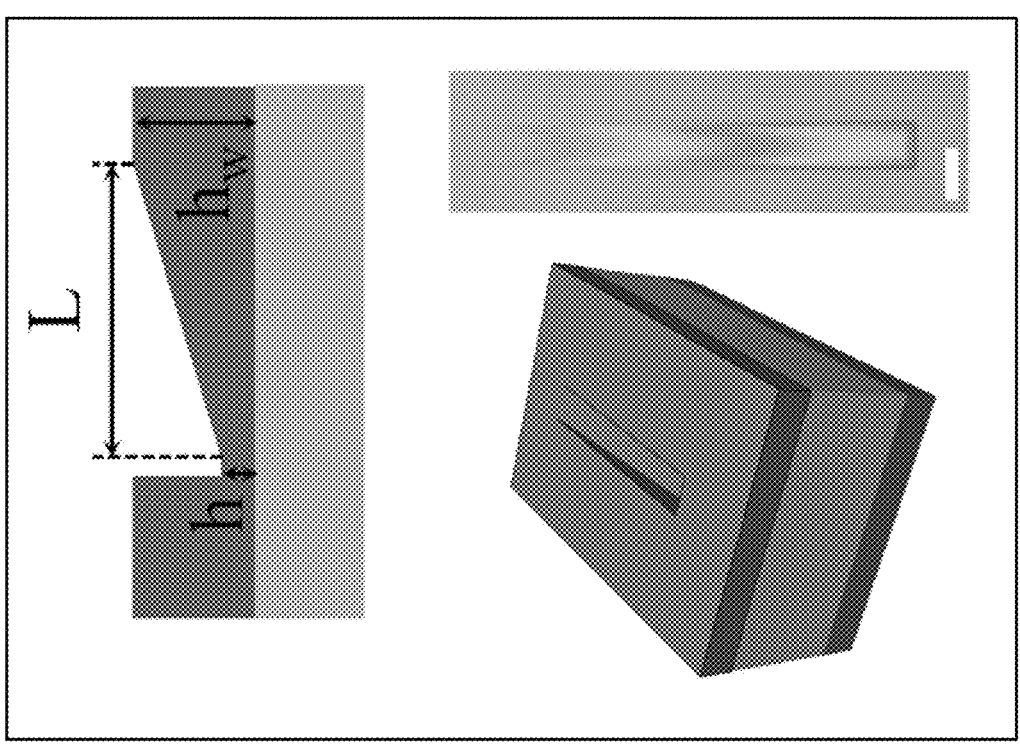
FIG. 4B depicts a schematic diagram of a second portion of a fabrication process of the example 3D tapered waveguide coupler (following FIG. 4A), showing a 3D pattern transfer onto a $Si_3N_4$ layer via plasma etching, the example 3D tapered waveguide coupler having a desired height h≈50 nm and taper length L≈170 nm being controlled by the etching time and selectivity S.
Figure 4B:
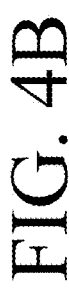
Figure 4E:
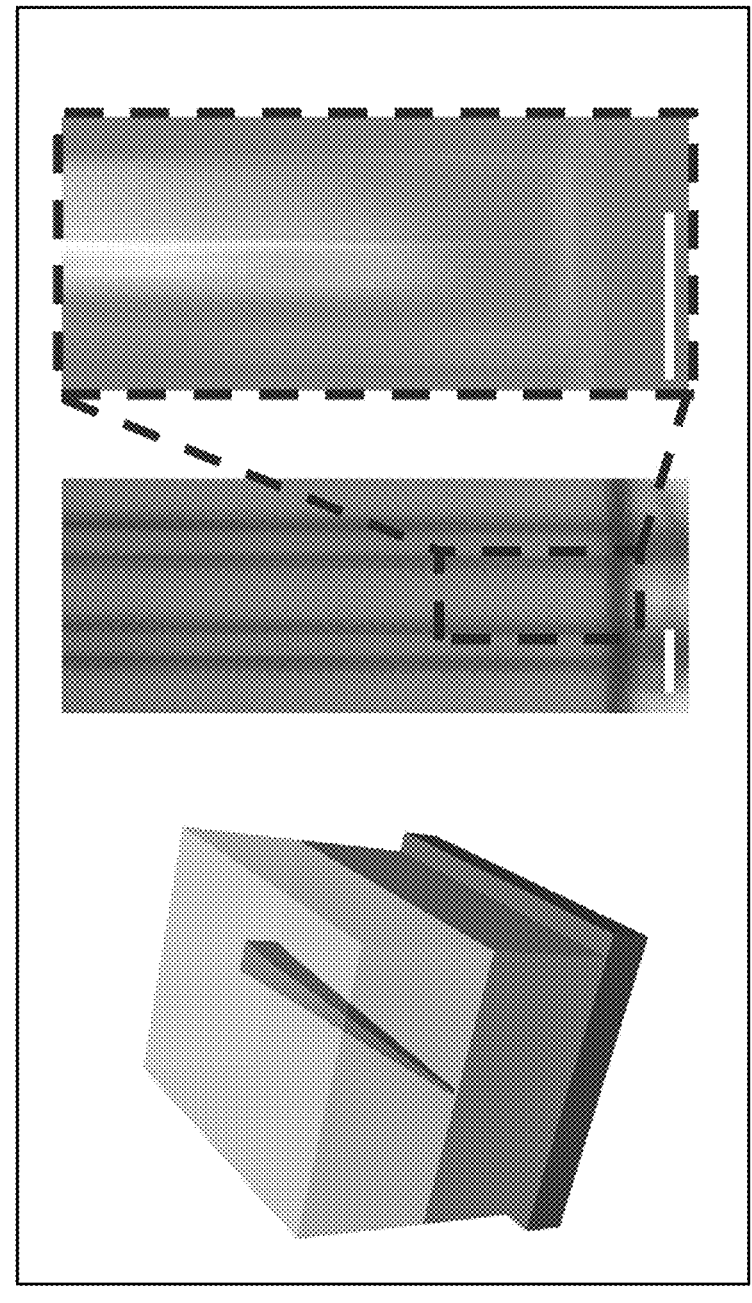
FIG. 4E depicts a schematic diagram of a fifth (final) portion of a fabrication process of the example 3D tapered waveguide coupler (following FIG. 4D), showing the coupler facet defined using photolithography and plasma etching, and the optical and SEM images showing the fabricated 3D tapered waveguide coupler (scale bar: 25 μm)
Figure 5B:
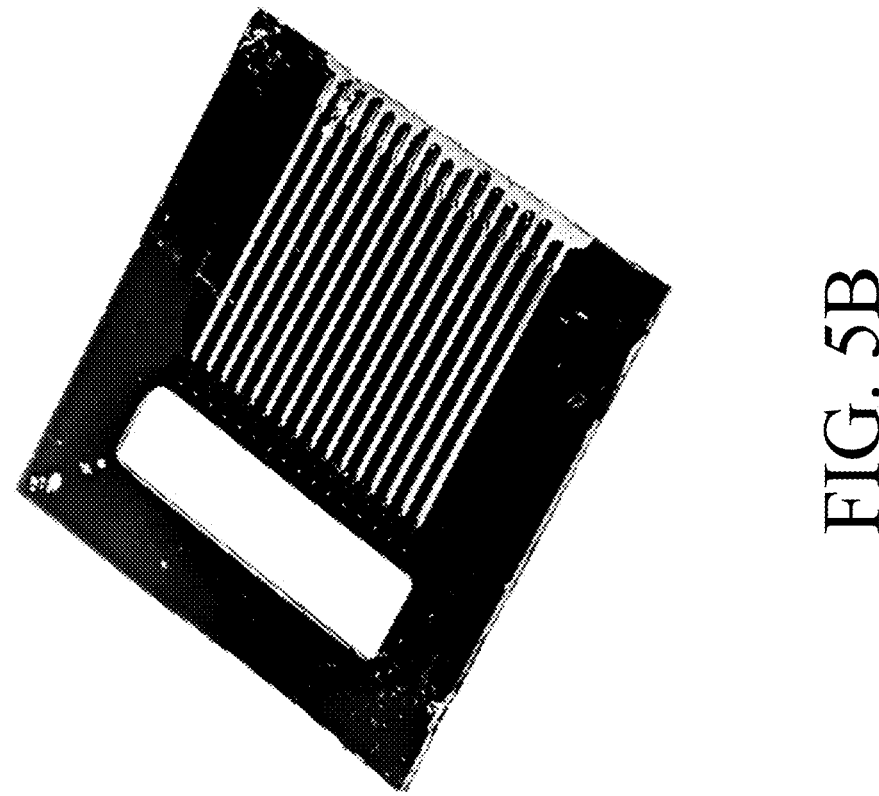
FIG. 5B depicts a fabricated circuit having nanophotonic devices as shown in FIG. 5A, 3D tapered waveguide couplers, and fiber grooves, the separation between the grooves being 450 μm.
Figure 5A:
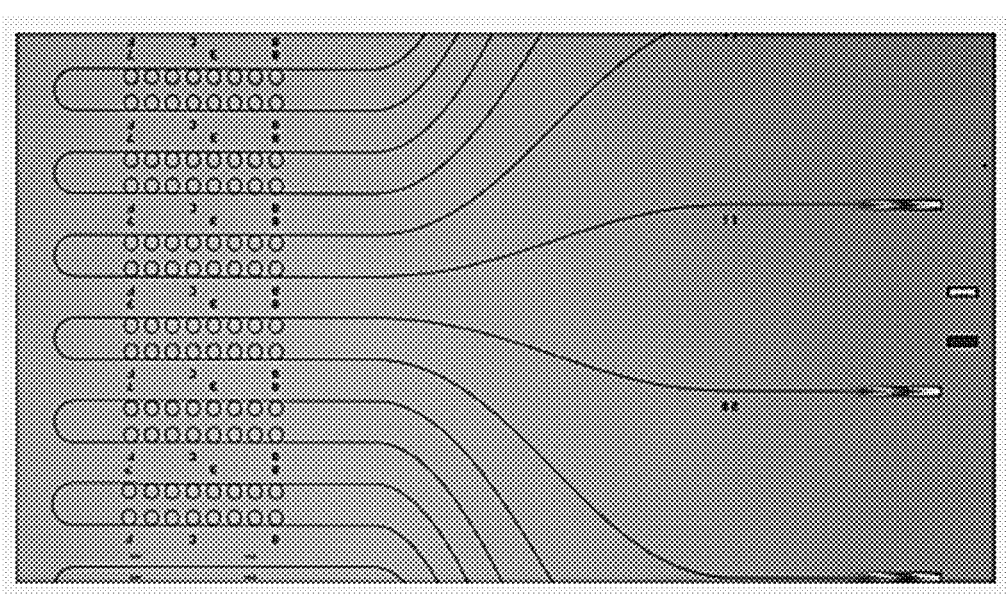
FIG. 5A depicts an image of a nanophotonic circuit integrated with a plurality of 3D tapered waveguide couplers, showing an optical image of the device layer following e-beam lithography.

To compare with simulation results, 3D TWCs are fabricated on a sample photonic circuit (see also, FIG. 5). Deep, U-shaped grooves in a photonic chip have been patterned to allow fiber placement and edge-coupling with 3D TWCs. For certain application requirements of this sample circuit, thickness of the buried oxide layer is limited to ~2 μm, and thus 3D TWCs are fabricated with asymmetric cladding under the geometric parameters shown as DUT in FIGS. 1 and 2B. In this sample circuit, the fabricated 3D TWCs are connected in pairs, each through a 4 mm-long $Si_3N_4$ bus waveguide of 1 μm nominal width, and an additional 200 μm-long 2D taper region on either end of the bus waveguide. The end facet of each 3D TWC is facing a U-groove (see, FIG. 4E) where it edge-couples to a flat-cleaved 780 HP optical fiber placed within the groove. Detailed fabrication procedures of the 3D TWC region will be described in the next section.

To perform optical fiber-to-bus waveguide transmission measurements, two cleaved optical fibers are aligned to a pair of 3D TWCs to maximize the total transmission $T_{tot}$ at 852 nm through the connecting bus waveguide. To extract the transmission coefficients of individual 3D TWCs, an isolated surface scatterer is selected residing roughly midpoint along the bus waveguide and its brightness measured through an optical microscope. Probe light is launched of fixed intensity and polarization through either coupler and the resulting brightness ratio $\eta(\gtrsim 1)$ recorded, which approximately gives the ratio of the transmission coefficients of two couplers. $T=\sqrt{\eta T_{tot}}$ is extracted for the coupler with optimized fiber alignment. Note that, for simple demonstration purposes, propagation loss is not separated in the bus waveguide (estimated to be ~0.06 dB/mm) from the measured transmission coefficients. This tends to give a slightly lower T value than the actual transmission coefficient of a 3D TWC.

Figure 3:
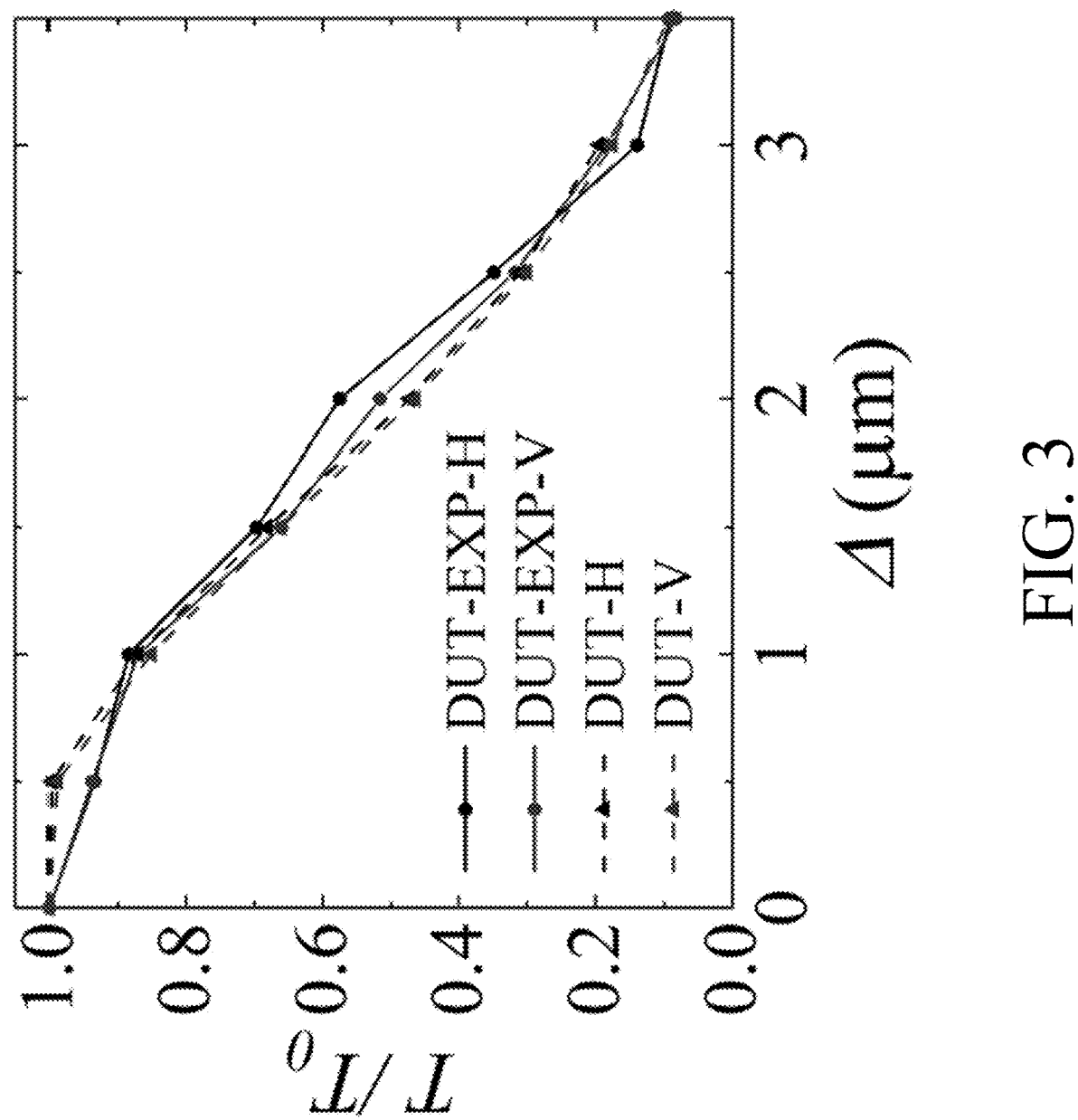
FIG. 3 depicts a graphical chart showing the measured (circles) and simulated (triangles) transmission (showing normalized to peak value $T_0$) of TM-polarization versus horizontal (H) and vertical (V) fiber displacements $\Delta$, showing one dB misalignment loss occurring at $\Delta \approx 1.2$ μm.

FIG. 2B shows measurement results, and particularly shows high transmission coefficients T>80% for the TE-polarization at three different wavelengths $\lambda=852$ nm, 894 nm, and 935 nm. Transmission coefficients of the TM-polarization are generally around 3% lower than that of TE-polarization but are still close to the ~80% value. The measurement results and wavelength dependence are consistent with simulation but are generally 3% to 5% lower than expected, likely due to unaccounted propagation loss in the bus waveguide. Lastly, the misalignment tolerance of the fabricated 3D TWC was tested. As shown in FIG. 3, the coupler shows≈0.8 dB/μm misalignment tolerance.

IV. Exemplary Fabrication Methods for Tapered Waveguide-to-Fiber Couplers

The fabrication processes of 3D TWCs are described in this section, which are fully compatible with general fabrication processes of integrated photonic circuits. The described fabrication procedures are summarized in FIGS. 4A-4E, where 3D patterning can be split into two major steps: (a) slope fabrication and (b) waveguide pattern transfer. In the first step, slope structures in the device layer are generated, which create the necessary vertical ramp profiles for making the 3D TWCs. In the second step, the horizontal profiles of the TWCs and other photonic components that only require 2D patterning are defined in a single lithography step.

Figure 4A:
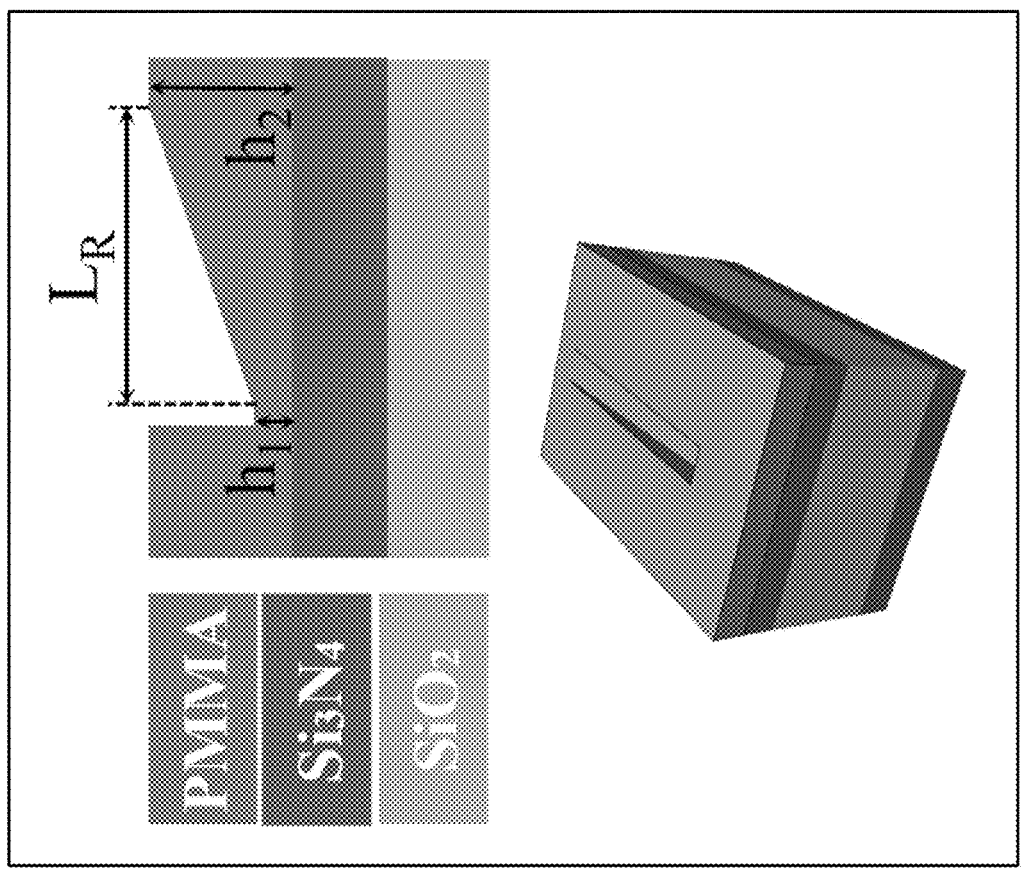
FIG. 4A depicts a schematic diagram of one portion of a fabrication process of one example 3D tapered waveguide coupler, showing 3D lithography using PMMA e-beam resist, the example 3D tapered waveguide coupler having a ramp profile of $h_1 \approx 100$ nm, $h_2 \approx 500$ nm, and $L_R \approx 230$ μm.
Figure 4D:
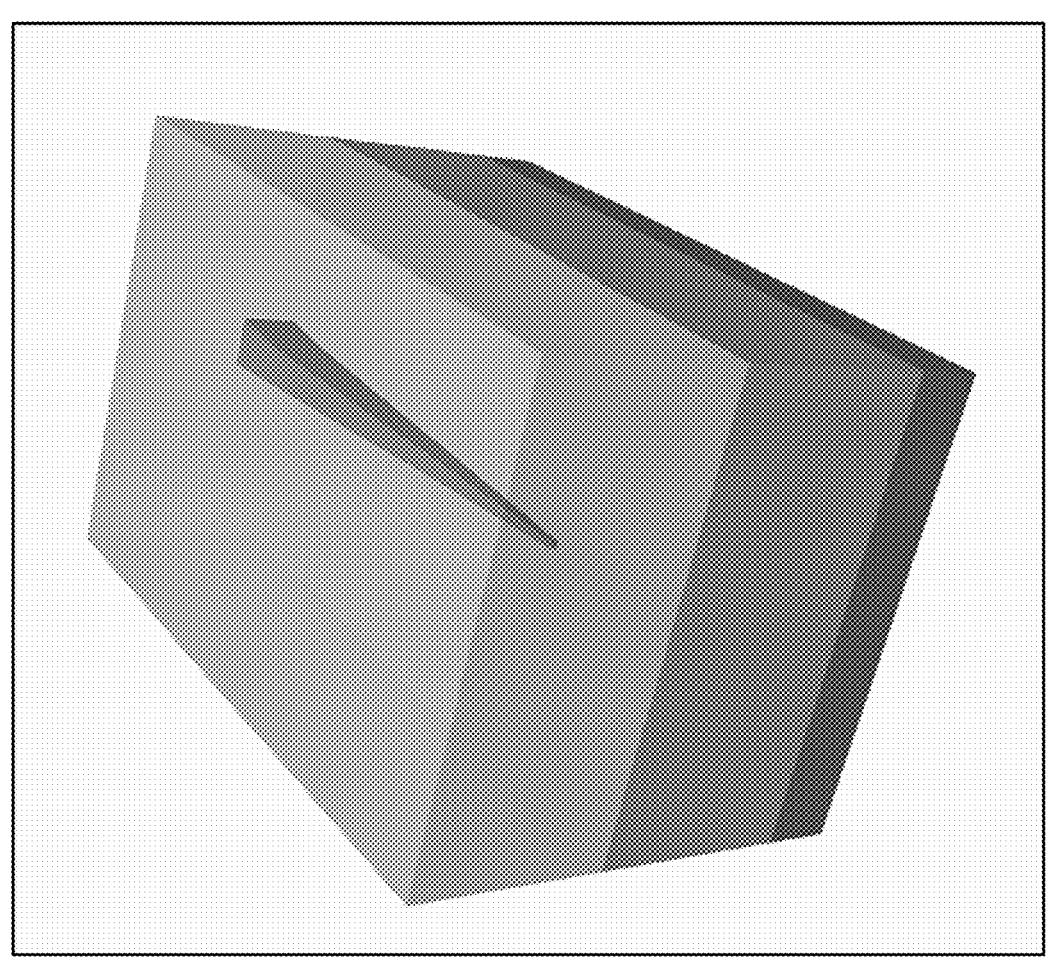
FIG. 4D depicts a schematic diagram of a fourth portion of a fabrication process of the example 3D tapered waveguide coupler (following FIG. 4C), showing the top $SiO_2$ cladding deposited using a HDPCVD process.
Figure 4D:
Figure 4C:
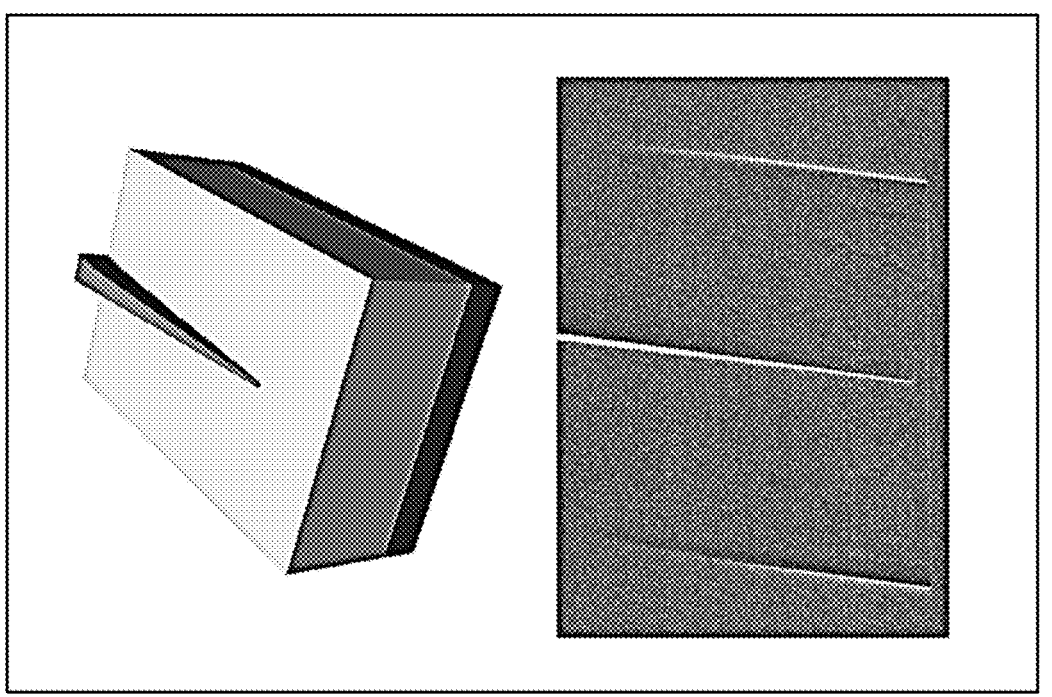
FIG. 4C depicts a schematic diagram of a third portion of a fabrication process of the example 3D tapered waveguide coupler (following FIG. 4B), showing the 3D tapered waveguide coupler fabricated following e-beam lithography and plasma etching, and a tilted SEM image showing the entire 3D tapered waveguide coupler after pattern transfer.

As shown in FIG. 4A, the slope fabrication process can start by using grayscale lithography. Firstly, a new chip is spin-coated with a thick PMMA layer (e.g., using Micro-Chem 950 PMMA A6). The resist layer can then be exposed with spatially varying e-beam doses using a 3D proximity effect correction function in a pattern data processing software (e.g., BEAMER from GenISys GmbH). After development, staircase structures would form in the resist layer because different exposures result in different development rates. The resist can then be thermally re-flowed by a hot-plate thermal treatment at around 110 degrees Celsius for around 2 hours, turning the staircase structures into smooth and continuous slopes. The slope patterns can then be transferred to the underlying $Si_3N_4$ device layer using inductively coupled plasma reactive-ion etching (ICP-RIE) with CHF3/O2 gas chemistry.

To achieve a desired slope/taper pattern without damaging the surface of the device layer, it can be important to create a proper PMMA slope pattern and control the time and selectivity in the dry etching process. As shown in FIGS. 4A-4B, the parameters are selected in a PMMA slope, $h_1$, $h_2$, and $L_R$, to produce a desired $Si_3N_4$ slope which ramps from an initial thickness h to the nominal thickness $h_w$ in a taper length L. Certain design rules could be implemented to ensure high fabrication yield and performance of 3D TWCs. Firstly, one can avoid high contrast in e-beam doses and large variation of resist height after development by keeping the thinnest part of the PMMA layer (i.e., $h_1$) to be ~20% of the nominal PMMA thickness $h_2$. Given the etch selectivity S≈1.2 between PMMA and $Si_3N_4$ (adjustable by the CHF3/O2 gas ratio), the taper length L can then be determined from the following ideal relation, $$L = SL_R \frac{h_w - h}{h_2 - h_1},$$

where $L_R$ is the length of the PMMA slope. It is noted that $L_R$ may need to be sufficiently longer than L to ensure that the rest of the device layer remains protected under PMMA even when there are variations in the etching rate and selectivity S.

After slope fabrication, 3D TWCs and other structures in the device layer may be fabricated using e-beam lithography and etch processes. Next, the $S_iO_2$ top cladding is deposited with high-density plasma chemical vapor deposition (HDPCVD) at low temperatures (e.g., as low as 50-70° C.) for lift-off additive processing while obtaining adequate film properties. Here, the top cladding materials are deposited only in regions not protected by a resist mask. This process can be ideal for non-cladded applications such as atom-light interaction or sensing. Following HDPCVD and lift-off, the fiber U-grooves, the cladding structures, and the facets of the 3D TWCs are defined with photolithography, followed by the ICP-RIE dielectric material etching and silicon deep-reactive-ion-etching (DRIE). FIG. 5 shows a sample nano-photonic circuit integrated with 3D TWCs and fabricated using the prescribed process. Alternatively, low pressure chemical vapor deposition (LPCVD) or plasma-enhanced chemical vapor deposition (PECVD) may be utilized.

Figure 6A:
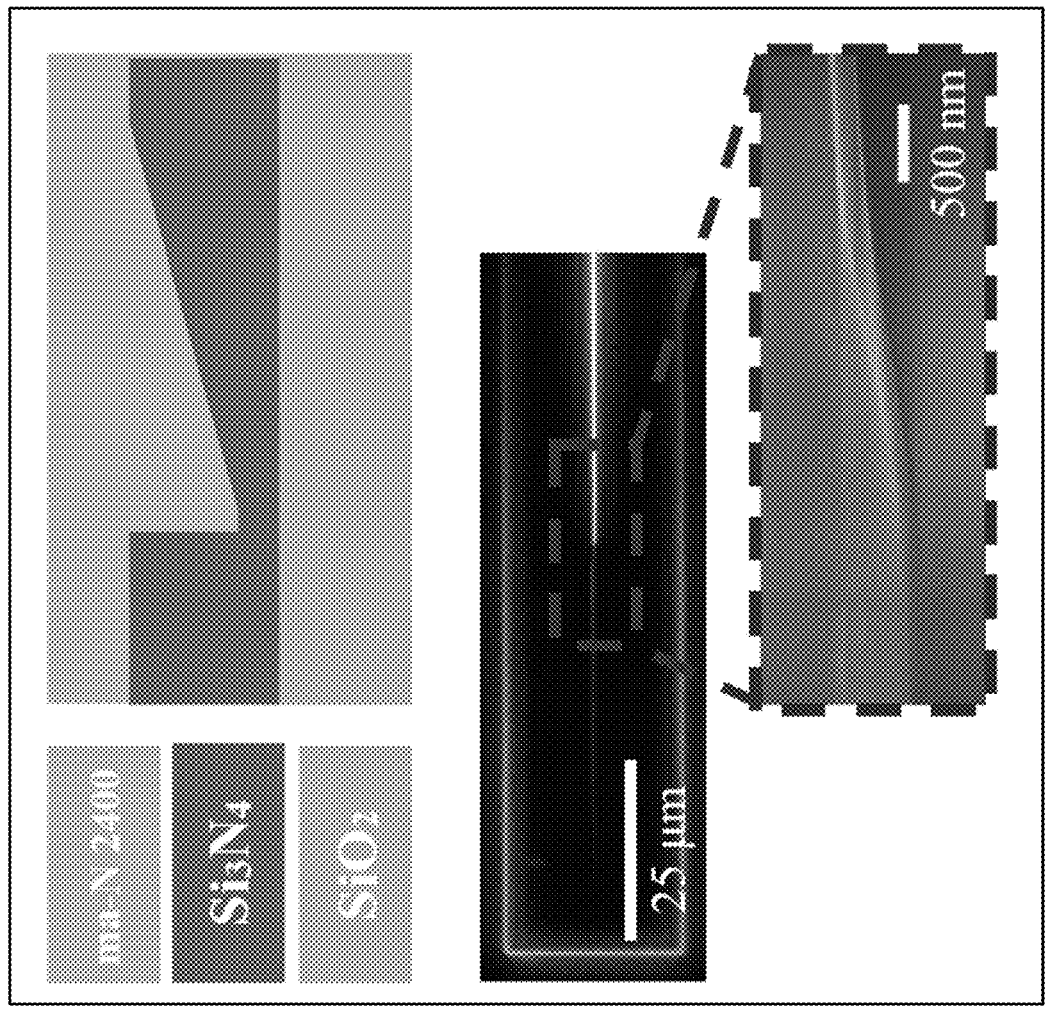
FIG. 6A depicts a schematic diagram showing the need for improving fabrication yield of an example 3D tapered waveguide coupler, showing tall step-coverage of e-beam resist at the bottom of the ramp (top) may cause collapsed pattern during development, and further shown in the optical and SEM images.

Lastly, the fabrication yield is discussed. Although all procedures involved in the 3D TWC fabrication are relatively straightforward, patterning a narrowly tapered waveguide on a slope may be challenging. In particular, during resist development for 2D waveguide pattern transfers, a tall step-coverage of spin-coated e-beam resist can be found near the bottom of a slope, as shown in FIG. 6A, which may collapse after development. For a slope that ramps from h=50 nm to $h_w$=300 nm, the step-coverage could reach 650 nm following spin-coating of a 400 nm-thick e-beam resist. In making narrowly tapered waveguides, such a tall resist pattern can collapse during the subsequent developing processes, as shown in the SEM image in FIG. 6A. A simple slope design as shown in FIG. 6A thus leads to a yield rate of around 60%.

Figure 6C:
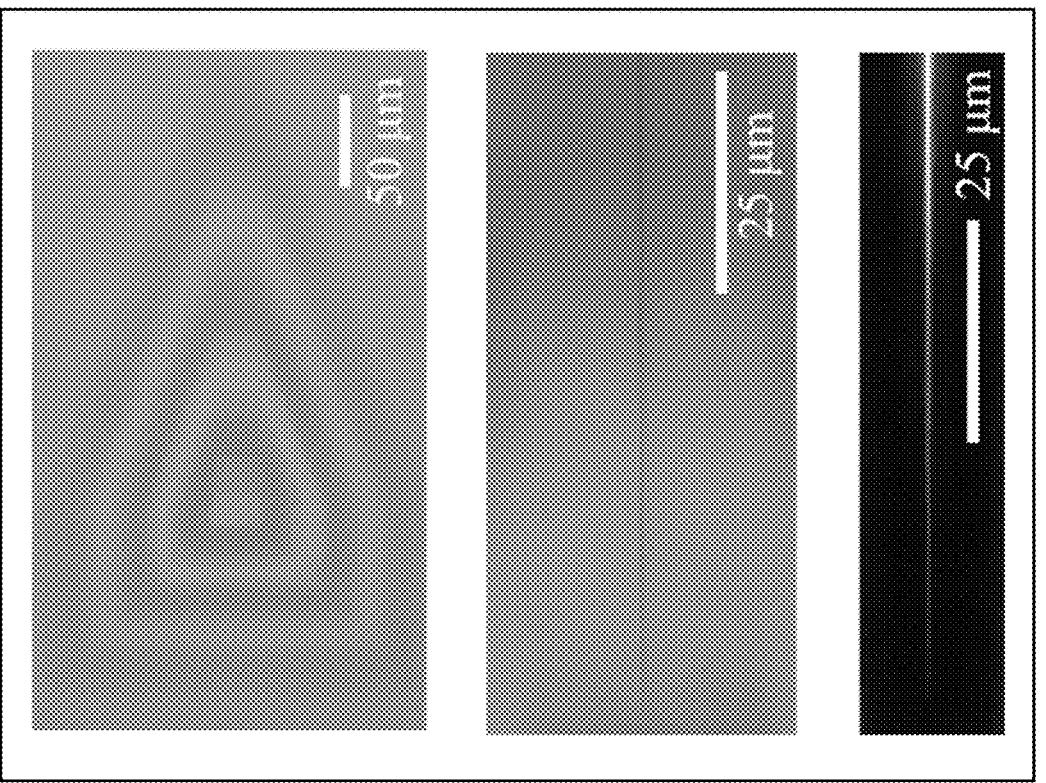
FIG. 6C depicts optical images of the improved ramp design of FIG. 6B after PMMA lithography (top), and showing a 3D tapered waveguide coupler structure after e-beam lithography (middle) and waveguide pattern transfer (bottom).
Figure 6B:
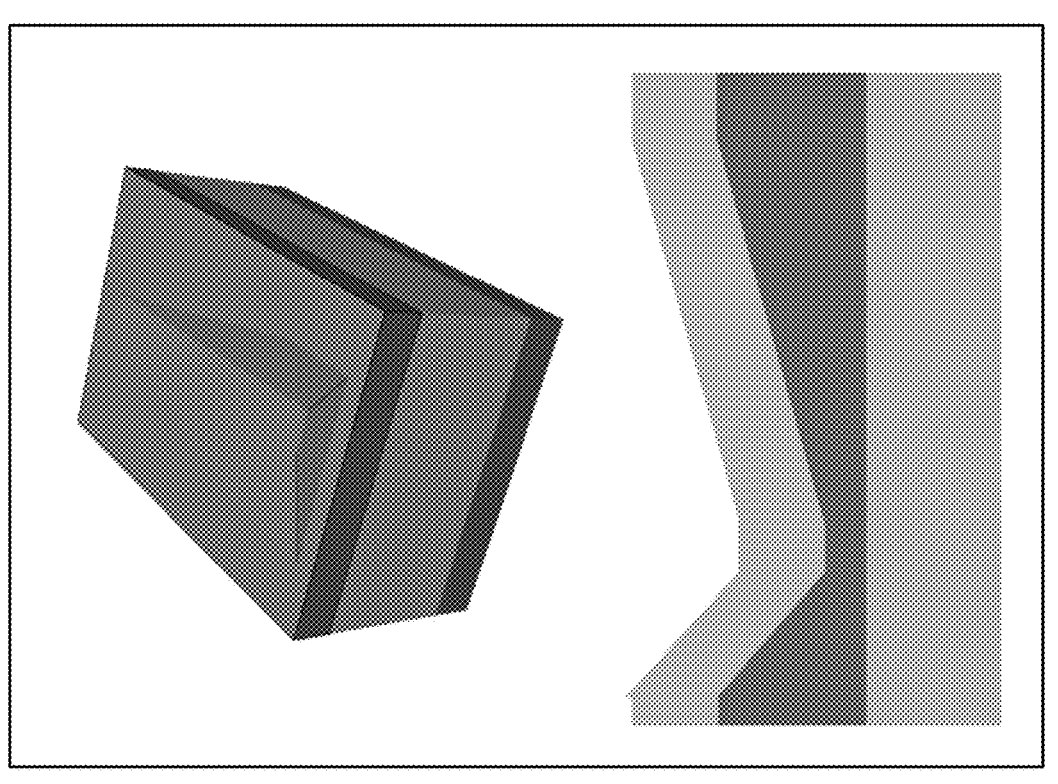
FIG. 6B depicts a schematic diagram showing an improved ramp design (top) for an example 3D tapered waveguide coupler with uniformly coated e-beam resist (bottom)

To limit or avoid tall step-coverage and improve fabrication yield, all vertical steps can be replaced in the PMMA structure with ramps. This gives a slope structure with wide opening in all directions and allows e-beam resist to spin-coat the device layer with more uniform thickness. FIG. 6B shows schematics, and the top image of FIG. 6C shows a fabricated ramp with wide opening. This uniform resist coating avoids collapse during resist development and pattern transfer, as shown in the middle and bottom images of FIG. 6C, respectively. Using ramp structures in PMMA, a nearly 100% yield rate of 3D TWCs can be achieved.

V. Conclusions

A grayscale fabrication technique with conventional 2D lithography is described which can create 3D TWCs for efficient coupling to cleaved optical fibers. The enabling technique and 3D TWC design permits high and polarization-insensitive fiber coupling efficiency >95% (<0.2 dB loss), wide bandwidth ($\Delta\lambda\approx$250 nm), and large misalignment tolerance −0.8 dB/μm. The experiment using a non-ideal, asymmetric design demonstrates the robustness of 3D TWC coupling, showing 85% transmission efficiency ($\approx$0.8 dB loss) and the expected misalignment tolerance. While optimizing symmetric waveguide couplers (d=h) has been a key focus, further improvements on mode overlap have been considered with non-symmetric couplers (e.g., facet height h<width d), where the minimum achievable height h$\approx$5 nm could be controlled by the dry etching process during slope fabrication. Such a design may be particularly useful for 2D lithography techniques such as deep UV lithography, which has a limited single-line resolution d$\gtrsim$150 nm. Lastly, the 3D lithography technique presented offers a new tuning knob for mode field shaping and effective refractive index engineering. It also shows the potential for applications in waveguide crossing, interplanar coupling, and chip-to-chip coupling.

As such, the systems and methods described provide an improved nanophotonic waveguide-to-fiber edge coupler that increases optical coupling efficiency between optical fibers and optical waveguides relative to existing devices. Particularly, 3D lithography is utilized in a standard fabrication process to control the taper geometry, and the etched $S_iO_2$ cladding allows for shaping the guided mode profile in both symmetric and asymmetric cladding structures. Further, no dedicated layer is needed for fiber coupling, and a high yield rate of fabrication is achieved by implementing a wider 3D ramp design.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element, or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

We claim:

1. A method of forming an optical waveguide from a multilayer material, wherein the multi-layer material includes a resist material layer deposited over a waveguide material layer, and the waveguide material layer deposited over a first cladding material layer, the method comprising:
   (a) using a grayscale electron-beam lithography procedure defining a spatially varying exposure dose profile in a positive polymethyl methacrylate (PMMA) resist material to form a three-dimensional tapered indentation into a top surface of the resist material layer, wherein the three-dimensional tapered indentation defines a length separated by a first end having a first depth and a second end having a second depth, wherein the first depth is greater than the second depth;
   (b) transferring the three-dimensional tapered indentation from the resist material layer to the waveguide material layer using plasma etching;
   (c) forming a three-dimensional tapered optical waveguide by removing a portion of the waveguide material layer adjacent to the three-dimensional tapered indentation; and
   (d) depositing a second cladding material layer over the optical waveguide to form an optical coupler having an optical input facet; wherein depositing the second cladding material layer over the optical waveguide includes performing at least one of a plasma-enhanced chemical vapor deposition (PECVD) procedure, a low-pressure chemical vapor deposition (LPCVD) procedure, or a high-density plasma chemical vapor deposition (HDPCVD) procedure.

2. The method of claim 1, wherein forming a three-dimensional tapered indentation into a top surface of the resist material layer includes:
   (i) forming a series of staircase structures into the top surface of the resist material layer, wherein each surface of each staircase structure that extends into the resist material layer in a direction perpendicular to the top surface of the resist material layer defines a sloped surface, and
   (ii) thermally smoothing the series of staircase structures into a continuous slope between the first end and the second end.

3. The method of claim 1, further comprising trimming the first and the second cladding layers to form a rectangular cladding structure surrounding the optical waveguide to therefore modify a guided mode profile of the optical waveguide.

4. The method of claim 3, wherein trimming the first and the second cladding layers includes performing a third lithography procedure and at least one of a second etching procedure or a cleaving procedure.

5. The method of claim 4, further comprising cleaving the first and second cladding layers to form the optical input facet.

6. A method of forming an optical waveguide from a multilayer material, wherein the multi-layer material includes a resist material layer deposited over a waveguide material layer, and the waveguide material layer deposited over a first cladding material layer, the method comprising:
   (a) using a grayscale electron-beam lithography procedure defining a spatially varying exposure dose profile in a positive polymethyl methacrylate (PMMA) resist material to form a series of staircase structures into a top surface of the resist material layer, wherein the series of staircase structures define a length separated by a first end having a first depth and a second end having a second depth, wherein the first depth is greater than the second depth;
   (b) thermally smoothing the series of staircase structures into a tapered indentation between the first end and the second end;
   (c) transferring the tapered indentation from the resist material layer to the waveguide material layer using plasma etching;
   (d) removing a portion of the waveguide material layer adjacent to the tapered indentation thereby forming a three-dimensional optical waveguide defined from the tapered indentation; and (e) depositing a second cladding material layer over the three-dimensional optical waveguide to form an optical coupler having an optical input facet, wherein depositing the second cladding material layer over the optical waveguide includes performing at least one of a plasma-enhanced chemical vapor deposition (PECVD) procedure, a low-pressure chemical vapor deposition (LPCVD) procedure, or a high-density plasma chemical vapor deposition (HDPCVD) procedure.

7. The method of claim 6, wherein each surface of each staircase structure that extends into the resist material layer in a direction perpendicular to the top surface of the resist material layer defines a sloped surface.

8. The method of claim 6, further comprising trimming at least one of the first cladding material layer or the second cladding material layer to form the optical input facet to therefore modify a guided mode profile of the optical waveguide.

9. An optical waveguide, comprising:

(a) an optical cladding material; and (b) a three-dimensional (3D) optical waveguide positioned inside the optical cladding material, wherein the 3D optical waveguide includes a first end defining a first cross-sectional area and a second end defining a second cross-sectional area, wherein the first cross-sectional area is less than the second cross-sectional area thereby forming a tapered length spanning between the first end and the second end, wherein the first end defines an optical input, wherein the 3D optical waveguide is fabricated by a process including forming a three-dimensional tapered indentation in a positive polymethyl methacrylate (PMMA) resist material by grayscale electron-beam lithography and transferring the indentation to a waveguide material layer using plasma etching;

wherein the optical cladding material is formed by performing at least one of a plasma-enhanced chemical vapor deposition (PECVD) procedure, a low-pressure chemical vapor deposition (LPCVD) procedure, or a high-density plasma chemical vapor deposition (HDPCVD) procedure.

10. The optical waveguide of claim 9, wherein the optical cladding material is formed into a rectangular shape having equal height and width.

\* \* \* \* \*